United States Patent Office 3,076,692
Patented Feb. 5, 1963

3,076,692
PROCESS FOR THE DECOMPOSITION OF TITANIUM ORES
Hermann Rüter, Ludwigshafen (Rhine), Fritz Weingärtner, Ludwigshafen (Rhine)-Rheingonheim, and Egon Cherdron, Limburgerhof, Kreis Ludwigshafen (Rhine), Germany, assignors to Gebrüder Giulini G.m.b.H., Ludwigshafen (Rhine), Germany, a corporation of Germany
No Drawing. Filed Apr. 7, 1960, Ser. No. 20,511
13 Claims. (Cl. 23—202)

The present invention relates to the decomposition of titanium ores and more particularly to a process for decomposing titanium ores by means of hydrochloric acid to produce titanium compounds useful as pigments and the like, such as titanium dioxide or titanium white.

In accordance with one conventional process for recovering titanium, such as from titanium-iron ores, the crude ore is first brought into solution, for example, by means of sulfuric acid. The trivalent iron present in the solution obtained is accordingly reduced and through precipitation about 70% of the dissolved iron is separated out as iron sulfate. The titanium-containing solution is suitably separated from the precipitate of iron sulfate as for example by filtration, and the resulting solution is then treated with a suitable inoculation or precipitation agent. Where, for example, titanium dioxide is used as the precipitation agent, the dissolved titanium salts formed with the sulfuric acid present are hydrolyzed, and the titanium is separated from the solution quantitatively as titanium dioxide. In accordance with this method of operation, for each kilogram of iron to be removed, about 1.78 kilograms of sulfuric acid must be employed. The resulting iron sulfate is practically valueless and in this regard the recovery of sulfuric acid formed through hydrolysis of the decomposition solutions can only be attained with considerable expenditure of energy.

These disadvantages do not occur if the decomposition of titanium ores is carried out with hydrochloric acid instead of with sulfuric acid. The iron chloride formed in an analogous manner may be readily recovered and easily thermally decomposed to yield a very pure iron oxide. The attendant hydrochloric acid bound to the iron is easily liberated in the thermal decomposition operation in the conventional manner. The recovered hydrochloric acid gas may, therefore, be used to form the desired hydrochloric acid solution for recycling in the process. In contrast to the difficulties encountered with sulfuric acid, when the decomposition of titanium ores is carried out with hydrochloric acid, there is no formation of undesirable by-products nor the necessity for expending additional energy for the recovery of the desired acid.

While it is known that titanium ores, for example, titanium-iron ores, may be decomposed by treatment with hydrochloric acid, it has not been possible heretofore to decompose these ores in such a manner that solutions are obtained which contain the entire titanium present in the ore as dissolved salts in the acid solution. It is true that in one sense a degree of decomposition of 100% may be obtained, but this is true only with reference to the quantity of iron which passes into solution. Nevertheless, there has always remained a considerable quantity of the titanium present as solid titanium dioxide in the residue. This titanium dioxide present in solid form occurs as a consequence of the decomposition by the formation of titanium dioxide in the solution. Specifically, the initially formed titanium tetrachloride is disadvantageously hydrolyzed in the solution causing the formation of titanium dioxide which is undesirable at this point. This formation of titanium dioxide is understandable in consideration of the known tendency to hydrolysis of dissolved titanium salts.

Moreover, a process is also known in which this property of titanium salts, i.e. the tendency to hydrolyze, is utilized so that after the termination of the decomposition of the titanium ore, the titanium is obtained as titanium dioxide in solid form in the residue while the iron contained in the ore is present almost completely in the acid solution. However, the working up of the residue, in order to recover the titanium in pure form, as titanium dioxide, is not commercially feasible in view of the type of operation which must be carried out and the required separation of the titanium dioxide from the other insoluble residue components of the ore. Additionally, the titanium dioxide produced in this manner does not suffice with respect to the required pigment qualities necessary for general application. A desired separation and recovery of the titanium from the secondary constituents contained in the ore, in which iron is predominately present, as well as the obtaining of an end product satisfactory with respect to pigment qualities, may, therefore, only be assured where hydrolysis during the hydrochloric acid decomposition is prevented, so that the entire quantity of the titanium present in the ore may be maintained in solution as chloride salts. From such decomposition solutions titanium dioxide, having the desirable pigment quality may accordingly be produced in the conventional manner.

Another method has been proposed in accordance with the foregoing in which the hydrochloric acid decomposition is carried out at temperatures which lie considerably below the boiling point of the decomposition solution in order to avoid possible hydrolysis and premature titanium dioxide formation. Inasmuch as such techniques of operation, carried out at low temperatures, suffer from the disadvantage of very low reaction speed, the decomposition time extending over several days, this method has not found wide application.

It is an object of the present invention to overcome the foregoing disadvantages and to provide a process for the decomposition of titanium containing ores wherein the ore and the hydrochloric acid are vigorously and intensively intermixed in order to convert substantially all of the titanium present into soluble form at an extremely high decomposition speed so as to prevent the premature formation of insoluble titanium compounds.

Other and further objects of the invention will become apparent from a study of the within specification and accompanying examples.

It has been found, in accordance with the instant invention, that at considerably higher temperatures than have been heretofore used, for example, 100 degrees C., titanium-containing ores may be decomposed with concentrated hydrochloric acid at extremely high decomposition speeds without the undesired premature formation of insoluble titanium compounds. The titanium-containing ore is vigorously and intensively intermixed with the concentrated hydrochloric acid, preferably at a temperature of at least 90 degrees C. so as to form titanium tetrachloride. Due to the extremely high decomposition speed and the reaction conditions maintained, the titanium tetrachloride salt is not hydrolyzed and the formation of insoluble titanium dioxide at this point is substantially completely inhibited.

In accordance with the invention, it has been found that the quantity of titanium dioxide which forms in the decomposition by means of hydrolysis directly depends on the decomposition speed. The quantity of titanium dioxide formed, through hydrolysis of the titanium tetrachloride salts, decreases with increasing decomposition speed, and is substantially equal to 0 at extremely high decomposition speeds. Therefore, it is important that a high initial concentration of titanium tetrachloride is reached in the shortest possible time, since highly concentrated solutions of titanium tetrachloride possess a greater resistance to this hydrolysis.

In accordance with the broader aspects of the process of the invention, it is possible to decompose titanium ores, such as titanium-iron ores, by intimately intermixing concentrated hydrochloric acid having a concentration of at least 32% by weight and preferably over 37% by weight, with the ore at a temperature of at least 90 degrees C., and preferably within the range of from 90-100 degrees C. The reaction may be carried out in a closed vessel equipped with means for agitating the reaction solution, such as a stirrer rotating at a speed of about 20 revolutions per minute. In accordance with this procedure, a decomposition degree of about 95% is achieved after only about 10 minutes of intimate intermixing of the reactants, the entire titanium present in the ore being already converted to soluble form. A determining factor, resulting in the quick conversion of the titanium to soluble form, is the intensive intermixing of the reaction components in accordance with the foregoing. In contrast thereto, in decompositions carried out at a slower rate, there has always been present a significant amount of the decomposed titanium dioxide in solid form in the residue.

The speed of reaction in accordance with the process of the invention is such that the process may be carried out in a period of time as short as 10 minutes. Generally, however, the process may be carried out in a period of time of from 10 minutes to 2 hours with excellent results and substantially complete conversion of the titanium present in the ore to soluble salt form.

In accordance with one feature of the invention, undesirable hydrolysis of the titanium chloride salts during the course of the decomposition may be decreased and even prevented by the addition to the reaction solution of hydrolysis inhibiting substances. Thus, for example, the decomposition with concentrated hydrochloric acid may be carried out in the presence of phosphorous compounds, such as phosphorous-pentoxide, phosphoric acids, and salts thereof. Specifically, as little as 2.5 grams of phosphorous-pentoxide per liter of decomposition solution may be used in accordance with the invention so as to prevent hydrolysis of the titanium tetrachloride formed and in turn avoid the premature formation of insoluble titanium dioxide. Where such phosphorous compounds are used, a higher reaction temperature may be maintained, i.e. a reaction temperature of from 90–140 degrees C., without detrimental effects. Generally, in the absence of such a phosphorous compound, a temperature of 100 degrees C., should not be exceeded.

Thus, in accordance with the present invention, by intermixing the titanium-containing ore, with the concentrated hydrochloric acid, at high speeds of agitation and a temperature of at least 90 degrees C., initial formation of titanium tetrachloride salt is effected very quickly. At such high concentrations of titanium tetrachloride, there is little tendency for hydrolysis and undesirably premature formation of titanium dioxide. The insoluble residue components forming at this point may be conveniently filtered from the hot solution. In this way, upon cooling the reaction solution, the less soluble chloride salts of other components in the ore, i.e. predominately iron chloride salts, are precipitated leaving the titanium tetrachloride salts in dissolved condition in the reaction solution. In this manner, the titanium is effectively separated from the remaining constituents in the ore, the titanium being substantially completely dissolved in the reaction solution at this point. Subsequently recovery of the titanium as titanium dioxide may be carried out in the conventional manner with respect to the titanium containing reaction solution, since the same is free from the major portion of the other ore constituents.

Since iron chloride is predominately quantitatively removed from the reaction solution upon cooling the same, a significant amount of hydrochloric acid may be recovered therefrom for recycling in the process. This may be carried out by thermally decomposing the iron chloride salts to form iron oxide and hydrogen chloride gas. The hydrogen chloride gas may be redissolved in concentrated solution to a concentration of at least 32% by weight and thereafter be used anew in the process. It will be understood that upon recovering the titanium from the reaction solution, as titanium dioxide, the hydrochloric acid may be recovered from the reaction solution and also be used anew in the process.

Generally, the period of decomposition may range from 10 minutes to 2 hours, longer periods of decomposition being unnecessary in accordance with the invention, especially since substantially complete decomposition of the ore takes place within 10 to 20 minutes where a temperature of about 100 degrees C. is employed. Advantageously, if the duration of decomposition is to be extended beyond a period of about 2 hours, an increased quantity of a phosphorous compound, such as for example, 5 grams of phosphorous pentoxide per liter, should be added in order to avoid possible hydrolysis and undesirable premature formation of titanium dioxide.

The phosphorous compounds which may be used as hydrolysis inhibiting substances in accordance with the invention include phosphorous pentoxide, orthophosphoric acid, as well as phosphate salts, such as iron phosphate.

While decomposition temperatures below about 90 degrees C. are possible, the speed of decomposition of the ore in such instances is generally too slight with respect to the terminal portion of the conversion reaction to be of commercial importance. In the same way, temperatures above about 105 degrees C. are possible for carrying out the decomposition reaction, but are generally unsuitable and unnecessary since temperatures within the preferred range of from 90 to 100 degrees C. effect decomposition at a high enough reaction rate that there is no necessity for further acceleration of the reaction. Moreover, at temperatures above about 105 degrees C., the danger of undesired hydrolysis is greater and to avoid such hydrolysis larger quantities of the inhibiting phosphorous compounds, such as phosphorous pentoxide, are usually necessary. Larger amounts of phosphorous compounds, however, may prove to be disturbing in the subsequent work up of the reaction solution. Another consideration is the fact that rubberized reaction vessels, such as reaction vessels having a lining of rubber material, may be used conveniently where the decomposition reaction is carried out at temperatures up to about 105 degrees C. On the other hand, if higher temperatures are used, more costly apparatus is rendered necessary and such apparatus must be able to accommodate higher operational pressures. Lastly, of course, higher temperatures involve higher energy requirements and this is to be avoided wherever possible in industrial operations.

The ratio of hydrochloric acid to titanium-iron ore in accordance with the invention is preferably such that a suitable excess of about 10% hydrochloric acid is present over the quantities required in accordance with the following equations:

$$TiO_2 + 4HCl = TiCl_4 + 2H_2O$$
$$FeO + 2HCl = FeCl_2 + H_2O$$
$$Fe_2O_3 + 6HCl = 2FeCl_3 + 3H_2O$$

A larger excess of hydrochloric acid should be avoided as this would markedly slow down the subsequent desired hydrolysis to meta-titanic acid.

In accordance with one embodiment of the invention, the quantity of acid used may be lessened such that only about 3 to 3.4 mols of HCl are used per mol of $TiO_2$, the amount of FeO and $Fe_2O_3$, however, remaining the same as aforesaid. In this embodiment, nevertheless, a two-step or multi-step decomposition process is required wherein the acid and titanium iron ore and/or decomposition residue is conducted in counter-current flow. This procedure has the advantage that the quantity of HCl being circulated is smaller while the hydrolysis speed is greater.

*Example 1*

600 grams of titanium-iron ore (44.5% $TiO_2$, 34.5% FeO, 12.5% $Fe_2O_3$) are reacted in a closed vessel with 2 liters of HCl (density 1.187 and/or 37.7% by weight). The reaction vessel is equipped with an overhead stirrer revolving at 20 r.p.m. The temperature of the water bath used was maintained at 95 degrees C. After 2 hours operating in this manner, a solution is obtained which contains 98.4% of the titanium present in the titanium-iron ore charged, and 99.9% of the iron present in the ore, in dissolved form. The decomposition solution is filtered from the insoluble portions while hot. The quantity of the solid residue (dried at 100 degrees C.) amounts to 5.6% of the titanium-iron ore initially charged. The decomposition solution is then cooled to 20 degrees C. and about 60% of the iron present in the ore charged precipitates out in the form of $FeCl_2.4H_4O$. The volume of the solution after separation of the iron-chloride amounts to about 1.85 liters. The analysis of this solution shows the following values: 142 grams $TiO_2/l$, 69 grams $FE_2O_3/l$, 56.7 grams HCl/l. (free hydrochloric acid). From the result of this analysis, it is evident that practically the entire quantity of the titanium present in the titanium-iron ore charged was converted into the dissolved form so that hydrolysis of the titanium tetrachloride did not take place during the decomposition.

In this connection, after separation (filtration) of the iron chloride salt $(FeCl_2.4H_2O)$, the solution is reduced by treatment with metallic iron at 70–90 degrees C. in the conventional manner in order to convert the trivalent iron present to divalent iron and about 2–5% of the tetravalent titanium into trivalent titanium. Conventional reduction by electric current techniques may also be used in the same way. The titanium may then be recovered by precipitation as meta-titanic acid at temperatures above 90 degrees C. in the conventional manner from the final reaction solution, affording pure titanium white pigment recovery.

The precipitated iron chloride salt ($FeCl_2.4H_2O$) is decomposed by heating to a temperaturwe above 250 degrees C., in this case 400 degrees C., in the presence of air and water vapor, to form $Fe_2O_3$ and HCl. The HCl may be returned to the final reaction solution (after removal of $TiO_2$) by conventional absorption techniques and the resulting concentrated acid again used for decomposition of the ore. If the decomposition speed is impeded, through a decrease in the speed of rotation of the stirrer with which the reaction vessel is equipped, i.e. from 20 revolutions per minute to 2 revolutions per minute, a solution of dissolved titanium chloride salts is obtained which only contains 85.2% of the titanium present in the titanium-iron ore charged.

*Example 2*

600 grams of titanium-iron ore (44.5% $TiO_2$, 34.5% FeO, 12.5% $Fe_2O_3$) are reacted in a closed vessel with 2 liters of HCl (density 1.187 and/or 37.7% by weight), in the presence of 5 grams of phosphorous pentoxide per liter of hydrochloric acid. The reaction is carried out in accordance with the procedure of Example 1 at a stirring speed of 20 revolutions per minute. However, a temperature of 110 degrees C. was maintained by means of an oil bath. In this manner, a solution is obtained which contains 100% of the titanium present in the ore in dissolved form. The iron present in the ore has likewise passed into solution completely (100%). The analysis of the decomposition solution corresponds approximately to that set forth in Example 1.

On the other hand, if the decomposition is carried out without addition of phosphorous-pentoxide, then a solution is obtained which contains only 23% of the titanium based on the initial quantity of titanium-iron ore charged, while the remaining titanium is present as solid titanium dioxide hydrate in the residue.

*Example 3*

1,000 kilograms of titanium-iron ore are reacted with 1508 kilograms of HCl at a temperature of about 100 degrees C. in accordance with the procedure of Example 1. The insoluble residue which forms (56 kilograms, density: 2.985) is separated by filtration, leaving a solution having a volume of 3.65 cu. meters (density: 1.375 at 90 degrees C.) and containing 122 grams $TiO_2$ per liter and 155 grams $Fe_2O_3$ per liter. Upon cooling this solution to a temperature of about 20 degrees C., iron chloride is precipitated which is removed by centrifuging yielding 903 kilograms $FeCl_2.4H_2O$. The solution remaining has a volume of 3.05 cu. meters (density: 1.362 and/or 38.5 degrees Bé.) and containing 145 grams $TiO_2$ per liter, 69 grams $Fe_2O_3$ per liter and 56.7 grams HCl per liter. This solution is reduced in the conventional manner using 44 kilograms of iron (at a temperature of 70 to 90 degrees C.) or the application of electrical current. The resulting solution contains 145 grams $TiO_2$ per liter, 90 grams $Fe_2O_3$ per liter and 56.7 grams HCl per liter.

Upon heating this solution at a temperature of about 100 degrees C., the desired titanium product precipitates from the solution and upon filtration, 445 kilograms of $TiO_2$ are recovered in pure white pigment form. The filtrate, having a volume of 2.94 cu. meters (density: 1.24) and containing 93.5 grams $Fe_2O_3$ per liter and 336 grams HCl per liter is subjected to an absorption procedure by treatment with 521 kilograms HCl obtained from the thermal decomposition step next described. In this absorption, iron chloride is precipitated which is removed by centrifuging yielding 517 kilograms

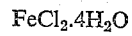

$FeCl_2.4H_2O$

The solution after the absorption step has a volume of 3.3 cu. meters and contains 20 grams $Fe_2O_3$ per liter and 453 grams HCl per liter. This final solution, rich in HCl, is recycled for use in the primary reaction of 1,000 kilograms of titanium-iron ore and 1508 kilograms HCl so that the desired 38% HCl initial solution will be maintained. The 903 kilograms $FeCl_2.4H_2O$ obtained in the initial cooling step and the 517 kilograms $FeCl_2.4H_2O$ obtained as a result of the absorption step (total 1420 kilograms) are subjected to thermal decomposition at a temperature of about 400 degrees C. whereby a yield of 572 kilograms $Fe_2O_3$ is obtained. As a consequence of this thermal decomposition, a yield of 521 kilograms of HCl (gas) is also obtained which is conducted to the absorption step as described above so as to form the hydrochloric acid solution to be recycled in the process.

What is claimed is:

1. Process for the decomposition of titanium ores which comprises vigorously and intensively intermixing the titanium ore and concentrated hydrochloric acid in the presence of a phosphorous compound at a temperature of at least 90 degrees C. to decompose the ore and to convert substantially all of the titanium present into soluble form in the reaction solution, said phosphorous compound serving as an inhibitor for the hydrolysis of dissolved titanium salts, and thereafter recovering said titanium in said soluble form.

2. Process according to claim 1 wherein said reaction is carried out at a temperature within the range of from 90 to 100 degrees C.

3. Process according to claim 1 wherein said hydrochloric acid has a concentration of at least 32% by weight.

4. Process according to claim 1 wherein said intermixing is carried out for a period of from 10 minutes to 2 hours.

5. Process according to claim 1 wherein said vigorous and intensive intermixing is carried out by stirring the reactants at a speed above 10 r.p.m.

6. Process according to claim 1 wherein the phosphorous compound is phosphorus pentoxide and said intermixing is carried out at a temperature of from 90 to 140 degrees C.

7. Process for the decomposition of titanium ores which comprises vigorously and intensively intermixing the titanium ore and concentrated hydrochloric acid in the presence of phosphorous pentoxide at a temperature of at least 90 degrees C. to decompose the ore and to convert substantially all of the titanium present into soluble form in the reaction solution, and thereafter cooling the reaction solution and recovering said titanium in said soluble form in the reaction solution from the solids separating out upon said cooling.

8. Process according to claim 7 wherein said phosphorous pentoxide is used in an amount of from 2.5 to 5 gms./liter of acid.

9. Process according to claim 1 wherein the hydrochloric acid is recovered from the reaction solution and recycled in the process.

10. Process for the decomposition of titanium ores principally containing titanium and iron which comprises vigorously and intensively intermixing the titanium ore and hydrochloric acid having a concentration of at least 32% by weight at a temperature of at least 90 degrees C. to decompose the ore and to convert substantially all of the titanium and iron present into soluble chloride salts in the reaction solution at the reaction temperature in the presence of a phosphorous compound serving as an inhibitor for hydrolysis of the dissolved titanium salts, cooling the reaction solution to cause substantial precipitation of the iron salts, and recovering the titanium present from the reaction solution remaining as titanium dioxide.

11. Process for the decomposition of titanium ores according to claim 10 wherein the phosphorous compound serving as an inhibitor for hydrolysis of the dissolved titanium salts is phosphorous pentoxide and said intermixing is carried out at a temperature of from 90 to 140 degrees C.

12. Process according to claim 10 wherein the iron salts formed are recovered and thermally decomposed, hydrochloric acid is recovered as a result of the thermal decomposition and said hydrochloric acid is recycled in the decomposition process.

13. Process for the decomposition of titanium ores principally containing titanium and iron which comprises vigorously and intensively intermixing the titanium ore and hydrochloric acid having a concentration of at least 32% by weight in the presence of phosphorous pentoxide at a temperature of at least 90 degrees C. to decompose the ore and to convert substantially all of the titanium and iron present into soluble chloride salts in the reaction solution at the reaction temperature, cooling the reaction solution to cause substantial precipitation of the iron salts, and recovering the titanium present from the reaction solution remaining as titanium dioxide.

References Cited in the file of this patent

UNITED STATES PATENTS

| | | |
|---|---|---|
| 2,088,913 | Llewellyn | Aug. 3, 1937 |
| 2,576,483 | Schultz | Nov. 27, 1951 |
| 2,622,964 | Aagaard et al. | Dec. 23, 1952 |
| 2,804,375 | Kamlet | Aug. 27, 1957 |
| 2,903,341 | Pike | Sept. 8, 1959 |